(12) United States Patent
Yoon (10) Patent No.: US 6,799,851 B2
(45) Date of Patent: Oct. 5, 2004

(54) OPTICAL PROJECTION SYSTEM USING COLOR DRUM

(75) Inventor: Jong Geun Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/305,069

(22) Filed: Nov. 27, 2002

(65) Prior Publication Data

US 2003/0112417 A1 Jun. 19, 2003

(30) Foreign Application Priority Data

Nov. 30, 2001 (KR) .................................... P 2001-75457

(51) Int. Cl.[7] .............................................. G03B 21/14
(52) U.S. Cl. ............................ 353/84; 353/20; 348/743
(58) Field of Search ............................. 353/20, 84, 31, 353/33, 34, 37; 348/742, 743, 771

(56) References Cited

U.S. PATENT DOCUMENTS

| | | | |
|---|---|---|---|
| 6,266,105 B1 * | 7/2001 | Gleckman | 348/743 |
| 6,520,644 B1 * | 2/2003 | Lee | 353/31 |
| 6,536,902 B2 * | 3/2003 | Lee | 353/20 |
| 6,575,579 B1 * | 6/2003 | Ho | 353/84 |
| 2001/0055097 A1 * | 12/2001 | De Vaan | 353/84 |
| 2002/0118343 A1 * | 8/2002 | Lee | 353/84 |
| 2003/0001990 A1 * | 1/2003 | Magarill et al. | 349/96 |

FOREIGN PATENT DOCUMENTS

| | | |
|---|---|---|
| EP | 0 977 442 | 2/2000 |
| WO | WO 01/28254 A1 | 4/2001 |
| WO | WO 01/49042 A1 | 7/2001 |

* cited by examiner

*Primary Examiner*—William C. Dowling
(74) *Attorney, Agent, or Firm*—Fleshner & Kim, LLP (57) ABSTRACT

Disclosed is an optical projection system having a simple structure by scrolling a light of each wavelength efficiently on a panel by preventing a color shift by adjusting a width of a color band on a color drum surface properly. The present invention includes the color drum outputting an incident light through a predetermined number of color bands on a drum plane to display wherein a light outputted from an end of a light projecting plane outputting the incident light has an incident angle equal to or smaller than 30° on the color band. Therefore, the present invention minimizes the influence of the color shift, provides an incident light in the scroll optical system effectively using the simple and inexpensive color drum, and prevents the degradation of image.

18 Claims, 5 Drawing Sheets

OPTICAL PROJECTION SYSTEM USING COLOR DRUM

This application claims the benefit of the Korean Application No. P2001-75457 filed on Nov. 30, 2001, which is hereby incorporated by reference.

BACKGROUND OF THE INVENTION

1. Field of the Invention

The present invention relates to an optical projection system using a color drum.

2. Discussion of the Related Art

Lately, as satellite and digital broadcastings are promoted in earnest, demands and interests for a wide-screen display having high resolution are increases. Hence, the expectation and role of projection/projector become important. Besides, image information for high brightness and colorfulness as well as high resolution is strongly demanded, whereby many efforts are made to research and develop an inexpensive optical system having high photo-efficiency.

The products of the related art mostly use the three plate system, thereby increasing a product cost. Hence, the single plate system is tried to use.

Figure 1:
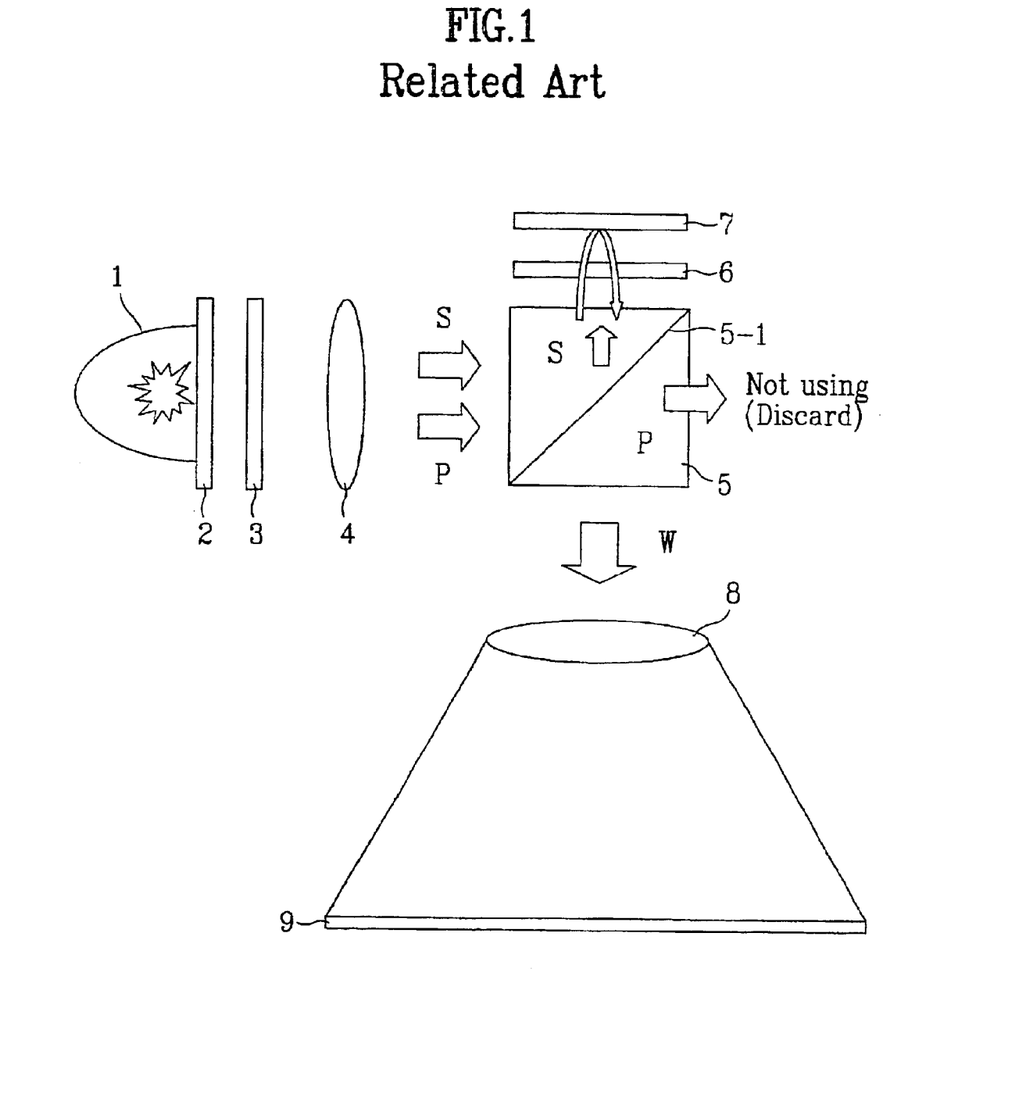
FIG. 1 illustrates a structural diagram of a single-plated optical projection system according to a related art.

FIG. 1 illustrates a structural diagram of a single-plated optical projection system according to a related art.

Referring to FIG. 1, a light from a lamp as a light source 1 consists of 50% P-waveform and 50% S-waveform and is equalized through FEL (fly eye lens) 2.

A system including a reflective LCD(liquid crystal display) uses the P- or S-waveform only. The S-waveform has excellent optical characteristics to use widely.

In order to increase a photo-efficiency, the waveform is passed through a PBS array 3 to turn into 75% S-waveform and 25% P-waveform. The photo-efficiency increases if 100% S-waveform is made. Yet, the current component technology enables to provide about 75% S-waveform. The S-waveform is reflected on a surface of PBS 5 to be incident on a panel 7, and P-waveform passes through the PBS 5 to abandon.

The S-waveform entering the panel 7 is modulated by liquid crystals to be expressed as a gray level and is then reflected thereon. The S-waveform passes the PBS 5 and a projection lens 8 to throw an image on a screen 9. Thus, the projection system is constructed.

Even if such a single-plated system uses a single panel only to be advantageous in aspect of cost, R, G, and B should be sent sequentially through a color separating means of a color switch or a color wheel (color sepuential). Hence, photo-efficiency is ⅓ of that of the three-plate system to degrade brightness. In order to implement the same brightness of the three plate system, a lamp(light source) of large capacitance is required. Besides, as the lamp capacitance increases, endurance decreases abruptly.

Moreover, if the color wheel or color switch is used, a light of the lamp should not be applied to the panel during an addressing time for applying data(gray levels) to the entire pixels of the panel and the time for which liquid crystals react. Such a fact should be considered. And, since the abandoned 25% P-waveform is unable to use, the photo-efficiency is substantially reduced below ⅕.

In order to overcome such disadvantages, a method of increasing a system photo-efficiency using a revolving prism is tried. Yet, an optical system for such a method is complicated to reduce reliance as well as fails to provide high photo-efficiency substantially due to its structure limitation.

SUMMARY OF THE INVENTION

Accordingly, the present invention is directed to an optical projection system that substantially obviates one or more problems due to limitations and disadvantages of the related art.

An object of the present invention is to provide an optical projection system having a simple structure by scrolling a light of each wavelength efficiently on a panel by preventing a color shift by adjusting a width of a color band on a color drum surface properly.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical projection system using a color drum according to the present invention includes the color drum outputting an incident light through a predetermined number of color bands on a drum plane to display wherein a light outputted from an end of a light projecting plane outputting the incident light has an incident angle equal to or smaller than 30° on the color band.

Preferably, the optical projection system includes a light source, a rod lens receiving the light from the light source, the rod lens having the light projecting plane inside to output the received light, a color drum having the predetermined number of the color bands on a color drum plane to output the incident light from the light projecting plane through the color bands, a panel receiving the light outputted from the color drum to modulate to output the received light in accordance with a gray level, and a screen receiving the modulated light from the panel to display.

More preferably, the number of the color bands of the color drum is at least six.

More preferably, the optical projection system further includes an FEL(fly eye lens) receiving to equalize the light incident from the light source.

More preferably, the optical projection system further includes a PBS array polarizing to output the light outputted through the color drum.

More preferably, the optical projection system further includes a PBS receiving the light outputted from the PBS array and the PBS reflects and transmits the received light from the PBS array in accordance with polarization to input to the panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is characterized in that a number of color bands is determined so that an angle from an end of a light-projecting plane inside a color drum to an opposite end does not exceed 30° to prevent a color shift. Hence, the present invention simply and conveniently enables to provide an optical projection system using a color drum.

An optimal number of the color bands depends on a size of the light-projecting plane, a position of the light-projecting plane, a characteristic of an optical system, and a construction of the optical system. The present invention enables to construct a color drum scroll optical system including at least six of the color bands.

Namely, in the optimal number of the color bands, a lower limit of the color band number within a range having no color shift is determined according to the size of the light-projecting plane, the position of the light-projecting plane, the characteristic of the optical system, and the construction of the optical system and a number of the color bands exceeding the lower limit(six) is determined. Thus, the present invention enables to minimize the influence of the color shift.

Figure 2:
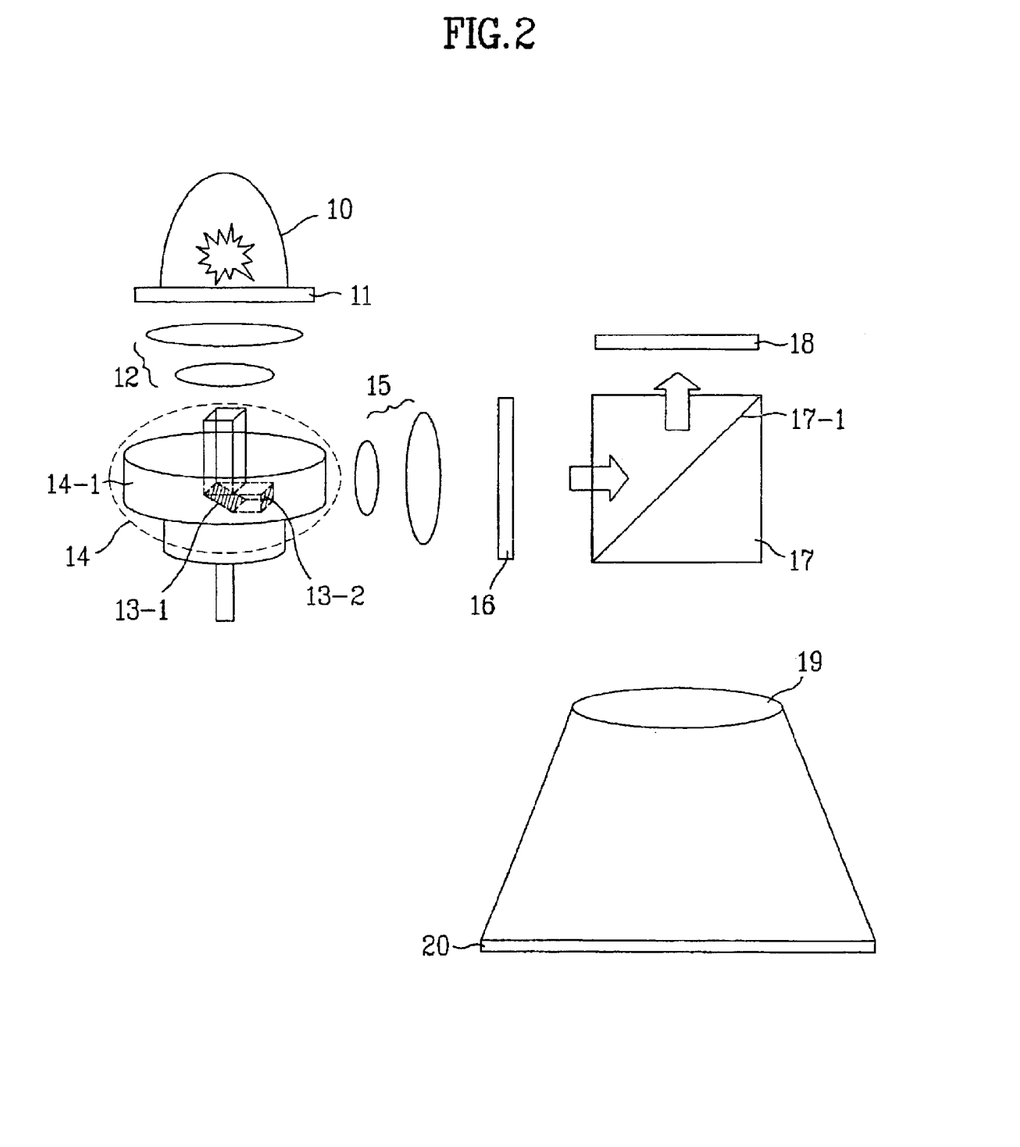
FIG. 2 illustrates a diagram of an optical projection system using a color drum according to the present invention.

FIG. 2 illustrates a diagram of an optical projection system using a color drum according to the present invention.

Referring to FIG. 2, an optical projection system using a color drum according to the present invention includes a light source 10, an FEL(fly eye lens) 11 equalizing a light incident from the light source 10, a lens 12 transmitting the light equalized from the FEL 11, a rod lens 13 receiving the light from the lens 12 to output through a light projecting plane 13-2 inside, a color drum 14 having a predetermined number of color bands on a color drum plane 14-1 and outputting the incident light from the light projecting plane 13-2 through the color bands, a lens 15 transmitting the light outputted through the color drum 14, a PBS array 16 receiving the light from the lens 15 to polarize to output, a PBS 17 receiving the light outputted from the PBS array to reflect and transmit in accordance with polarization, a panel 18 receiving the light outputted from the PBS 17 to modulate to output the received light in accordance with a gray level, and a screen 20 receiving the incident light modulated from the panel 18 to display through a projecting lens 19.

An operational principle of the optical projection system using the color drum according to the present invention is explained as follows.

First of all, a white light coming from the light source (lamp) 10 is equalized through the FEL 11, and the equalized light is incident on the rod lens 13 through the lens 12.

Figure 3:
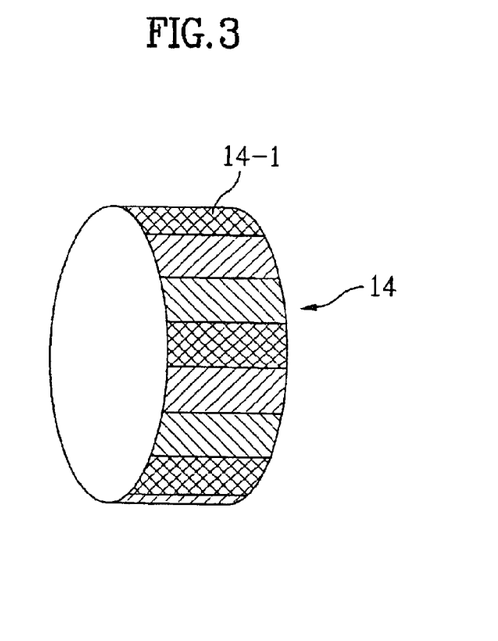
FIG. 3 illustrates a bird's-eye view of a color drum according to the present invention.

In this case, the light is reflected on the mirror 13-2 inside the rod lens 13 and then passes through the revolving drum 14, as shown in FIG. 3, constructed with a plurality of R/G/B color bands through the light projecting plane 13-2 at an end of the rod lens 13.

The light passes through the lens 15 to turn into an S-waveform through the PBS array 16 mostly. The light is then incident or reflected on a PBS plane 17-1 of the PBS 17 to enter the panel 18 but is divided into a modulated P-waveform and S-waveform in accordance with the gray level to reflect back.

In this case, the S-waveform is reflected on the PBS plane 17-1 to go in toward the lamp 10 and the P-waveform is transmitted to be incident on the screen 20 through the projecting lens 19. In this case, the gray level of R/G/B is determined by an amount of the P-waveform modulated by liquid crystals of the panel 18.

In this case, a position of the light projecting plane 13-2 of the rod lens 13 inside the color drum 14 is random inside the color drum 14 according to the design of the rod lens 13 and a size of the light projecting plane 13-2 can be modified variously.

A wavelength, i.e. a color, which is reflected on the mirror 13-1, is changed in accordance with an incident angle θ from on a surface of the color drum 14 to the light projecting plane 13-2 to raise a color shift.

Figure 4:
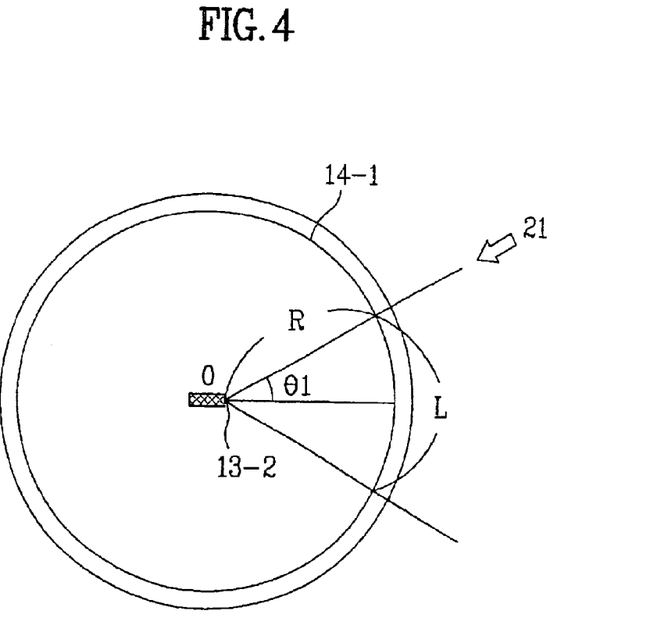
FIG. 4 illustrates a diagram of a device for detecting a light wavelength passing through the color drum plane according to the present invention in case that a light projecting plane is located at a center of a color drum.

FIG. 4 illustrates a diagram of a device for detecting a light wavelength passing through the color drum plane according to the present invention in case that a light projecting plane 13-2 is located at a center of a color drum 14.

Referring to FIG. 4, in order to measure a color shift in accordance with an incident angle θ1 on a very small light projecting plane 13-2 at a center of a color drum 14, a detector 21 is put outside the color drum 14 to measure the color shift according to the incident angle θ1. A result is shown in FIG. 5.

Figure 5:
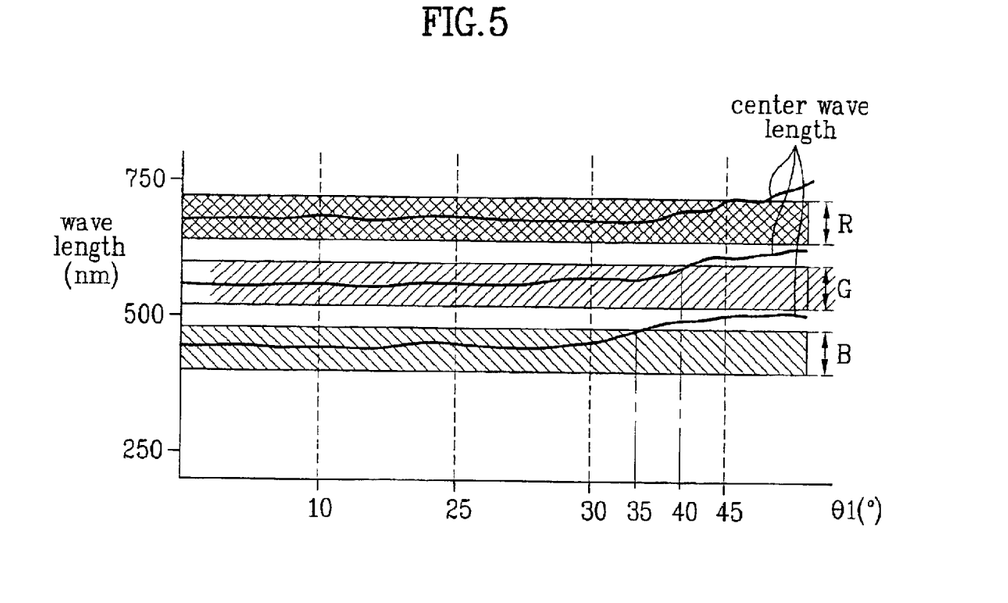
FIG. 5 illustrates a graph of R/G/B wavelength variation according to an incident angle on a color drum from the light projecting plane in FIG. 4.

FIG. 5 illustrates a graph of R/G/B wavelength variation according to an incident angle on a color drum from the light projecting plane in FIG. 4.

R, G, and B color bands in FIG. 5 indicate wavelength ranges of R, G, and B(allowable wavelength range) used in the optical system, respectively. And, a solid line represents a central wavelength of a light outputted through the color drum plane 14-1 according to the incident angle θ1 outputted from the light projecting plane 14-1. Central wavelengths of the R, G, and B are measured using the device shown in FIG. 4.

Referring to FIG. 5, the wavelength variations according to θ1 differ from each other according to R, G, and B. In case of R, if θ1 exceeds 45°, a material of the color drum plane 14-1 of the color drum 14 having an R color band outputs a light having a wavelength different from that of the light of the R-wavelength.

Similarly, if θ1 exceeds 40° in case of G, a light having a wavelength different from a G-wavelength is outputted. And, if θ1 exceeds 35° in case of B, a light having a wavelength different from a B-wavelength is outputted.

Moreover, since the wavelength of each of the R, G, and B colors incident on the panel through the optical projection system in FIG. 2 includes a predetermined range of wavelength as well as the central wavelength, an allowable incident angle θ1 for B in FIG. 5 is 30°, an allowable incident angle θ1 for G in FIG. 5 is 35°, and an allowable incident angle θ1 for R in FIG. 5 is 38°~39°.

When the R, G, and B are incident by having the incident angle of the B-wavelength, which has the smallest incident angle range, be the maximum, the incident angle should be equal to or smaller than 35°.

Hence, the number of the color bands for the color drum 14 in FIG. 3 is determined as 360°/60°=6, i.e. at least six using the measurement result in FIG. 4 and FIG. 5.

If the light projecting plane 13-2, as shown in FIG. 4, is at a center O of the color drum 14 and a horizontal width of the light projecting plane 13-2 is negligible, the width L of the color band of the color drum 14 is determined by Equation 1 resulted from the following calculation.

$$L = \frac{2\pi R}{\frac{360}{60}} = \frac{\pi R}{3} \qquad \text{[Equation 1]}$$

Figure 6:
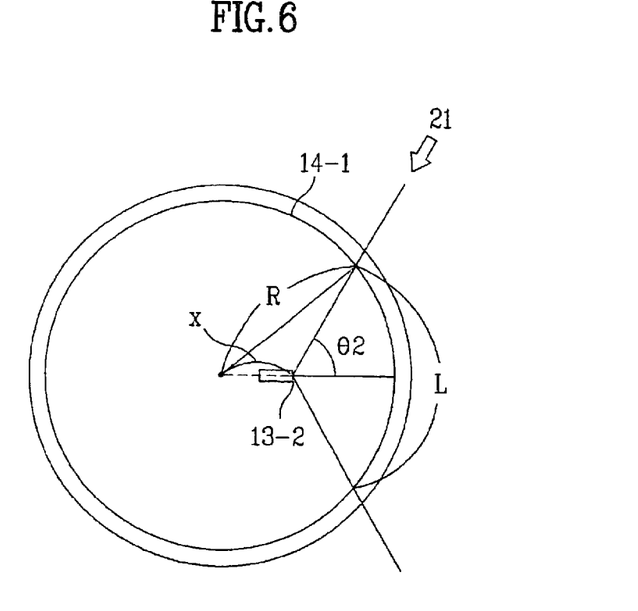
FIG. 6 illustrates a diagram of a device for detecting a light wavelength passing through the color drum plane according to the present invention in case that a light projecting plane is deviated from a center of a color drum.

FIG. 6 illustrates a diagram of a device for detecting a light wavelength passing through the color drum plane according to the present invention in case that a light projecting plane 13-2 is deviated from a center O of a color drum 14.

Referring to FIG. 6, if a color band determined by the incident angle θ1 in FIG. 4 is used when a location of a very small light projecting plane 13-2 deviates from a center O of a color drum 14 to move toward a color drum plane 14-1, a color-shifted wavelength is outputted through the color drum plane 14-1 instead of a wavelength outputted from the light projecting plane 13-2 deviated from a color shift allowable range.

Namely, if the light projecting plane 13-2 deviates from the center of the color drum 14, an incident angle θ2 is greater than the incident angle θ1 to deviate from the color shift allowable range.

Hence, in order to minimize the color shift, the number of the color bands is increased to restrict the incident angle of the B color having the smallest allowable range of the incident angle to be equal to or smaller than 30°.

The color shift allowable range, i.e. the width L of the color band of the color drum, is varied in accordance with the location of the rod lens 13 inside the color drum 14, i.e. the location of the light projecting plane 13-2.

When the light projecting plane 13-2, as shown in FIG. 6, deviates from the center O of the color drum 14 as far as 'x', the width L of the color drum is determined by Equation 2 resulted from the calculation as follows.

$$L = \frac{\pi R}{90} \tan^{-1} \left[ \frac{\sqrt{4R^2 - x^2} - \sqrt{3x^2}}{\sqrt{3}\left(\sqrt{4R^2 - x^2} + \sqrt{3x^2}\right)} \right], \qquad \text{[Equation 2]}$$

where R is a radius of color drum.

Moreover, a wavelength, i.e. color, reflected from the mirror 13-1 according to the location, horizontal width, or vertical width of the light projecting plane 13-2 is changed to raise the color shift, which should be considered as well.

Figure 7:
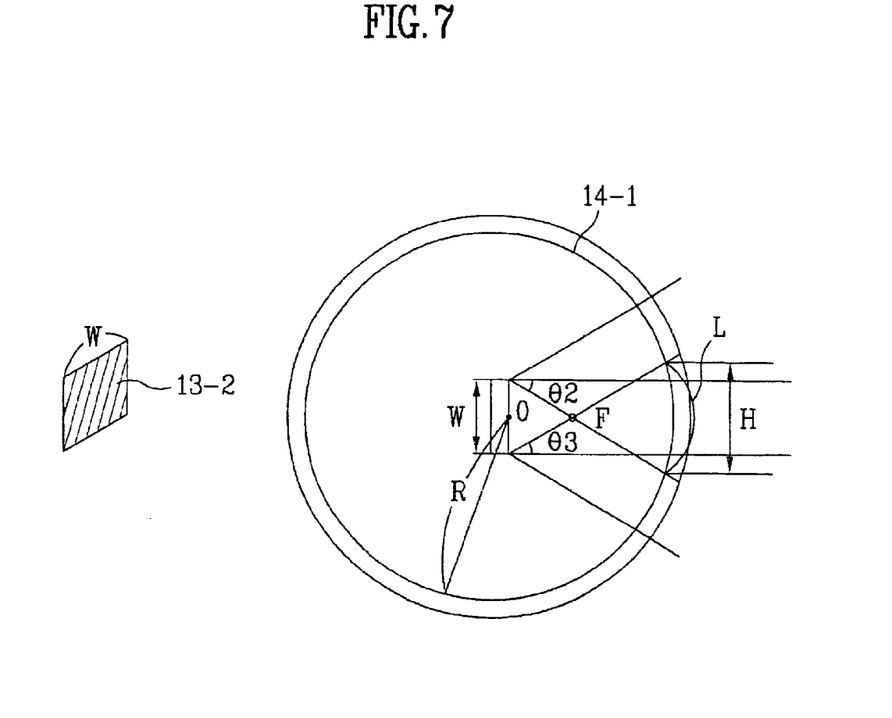
FIG. 7 illustrates a diagram of a device for detecting a light wavelength passing through the color drum plane according to the present invention in case that a light projecting plane is located at a center of a color drum and a width of the light projecting plane is 'W'.

FIG. 7 illustrates a diagram of a device for detecting a light wavelength passing through the color drum plane according to the present invention in case that a light projecting plane 13-2 is located at a center O of a color drum 14 and a width of the light projecting plane 13-2 is 'W'.

Like 'A' in FIG. 7, the light projecting plane 13-2 in the optical projecting system has a constant size (horizontal width W). Since an incident angle θ2 or θ3 incident on an opposite surface of the color drum 14 from one end of the width W of the light projecting plane 13-2 is unable to exceed 30° by taking a color B as a reference, a height of the color ban is equal to or smaller than 'H' and the angle should be smaller than 30°.

In this case, since a proper size of the color band is smaller than the case of the very small light projecting plane(very small horizontal width W), the necessary number of the color bands increases. Namely, the number of the color bands exceeds six.

When the light projecting plane 13-2 has the horizontal width W, a width L of the color drum is determined by Equation 3 resulted from the calculation as follows.

$$L = \frac{\pi R}{90} \tan^{-1} \left[ \frac{R - F}{\left(\sqrt{3} R + (2 - \sqrt{3})F\right)} \right], \qquad \text{[Equation 3]}$$

where R is a radius of color drum and F is a focal distance $$\left( F = \frac{\sqrt{3}}{2} W \right).$$

Figure 8:
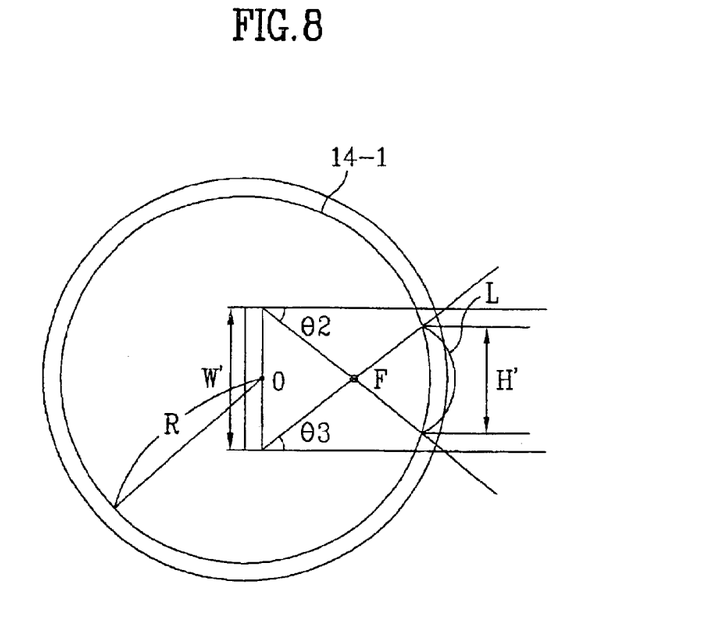
FIG. 8 illustrates a diagram of a device for detecting a light wavelength passing through the color drum plane according to the present invention in case that a light projecting plane 13-2 is located at a center of a color drum 14 and a width of the light projecting plane 13-2 is W' greater than W.

FIG. 8 illustrates a diagram of a device for detecting a light wavelength passing through the color drum plane according to the present invention in case that a light projecting plane 13-2 is located at a center of a color drum 14 and a width of the light projecting plane 13-2 is W' greater than W.

Referring to FIG. 8, since a focal distance gets closer to a color drum plane 14-1, a height of the color band is H' smaller than H in FIG. 7 and the angle is smaller than that in FIG. 7.

In this case, since a proper size of the color band is smaller than the case of the very small light projecting plane(very small horizontal width W), the necessary number of the color bands increases. Namely, the number of the color bands should exceed six.

Besides, since the height H' of the required color drum becomes smaller than H, color bands are required more than are required in FIG. 7.

When the light projecting plane 13-2 has the horizontal width W' and deviates from the center O of the color drum 14 as far as 'x', a width L of the color drum is determined by Equation 4 resulted from the calculation as follows.

$$L = \frac{\pi R}{90} \tan^{-1}\left[\frac{\sqrt{4R^2 - (x+F)^2} - \sqrt{3(x+F)^2}}{\sqrt{3}\left(\sqrt{4R^2 - (x+F)^2} + \sqrt{3(x+F)^2}\right)}\right] \quad \text{[Equation 4]}$$

where R is a radius of color drum and F is a focal distance $$\left(F = \frac{\sqrt{3}}{2} W'\right).$$

When it is designed that the light projecting plane 13-2 having the predetermined width W or W' in FIG. 7 or FIG. 8 deviates from the center of the color drum 14 to move toward the color drum plane 14-1, a location of a focus F at an intersection between the incident angles θ2 and θ3 from both ends of the width W or W' on the opposite color drum plane 14-1 can be moved to a distance inside the color drum 14 only. Besides, as the focus F gets closer to the color drum plane 14-1, the number of the color bands increases.

In this case, the preparing cost of the color drum increases to be expensive.

Hence, in order to construct the optical projection system by moving the light projecting plane 13-22 sufficiently to the color drum plane 14-1, the width W or W' of the light projecting plane 13-2 is made small, an F number of the optical system is adjusted to restrict a scattering angle of the light at one point of the light projecting plane 13-2 to be smaller than 30°, e.g. 15°~20°, and the number of the color bands is increased.

The present invention can apply a light in an addressing time by enabling to scroll R, G, and B sequentially using the simply structured color drum 14. Hence, even if the present invention uses the single plate system, the reduction of photo-efficiency is minimized.

Besides, the application of such a system enables to increases the photo-efficiency up to ⅓ to be higher than that of the previous single plate system, thereby being applicable to an optical system for a projector as well as a projection TV and enabling to implement image of high brightness and colorfulness.

Accordingly, the above-described optical projection system using the color drum according to the present invention has the following effects or advantages.

First of all, in order to attain the optimal number of the color bands, the present invention determines the lower limit of the number of the color bands in the no color shift range in accordance with the size of the light projecting plane, the location of the light projecting plane, the characteristics of the optical system, and the method of constructing the optical system and the number of the color bands greater than the lower limit(six). Therefore, the present invention minimizes the influence of the color shift, provides an incident light in the scroll optical system effectively using the simple and inexpensive color drum, and prevents the degradation of image.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical projection system using a color drum, the optical projection system including the color drum outputting an incident light through a predetermined number of color bands on a drum plane, wherein a light outputted from an end of a light projecting plane outputting the incident light has an incident angle equal to or smaller than 30° on the color band, the optical projection system comprising:
   a light source;
   a rod lens receiving the light from the light source, the rod lens having the light projecting plane inside the color drum to output the received light;
   the color drum having the predetermined number of the color bands on a color drum plane to output the incident light from the light projecting plane through the color bands;
   a panel receiving the light outputted from the color drum to modulate to output the received light in accordance with a gray level; and
   a screen receiving the modulated light from the panel to display.

2. The optical projection system of claim 1, wherein the number of the color bands of the color drum is at least six.

3. The optical projection system of claim 1, further comprising an FEL(fly eye lens) receiving to equalize the light incident from the light source.

4. The optical projection system of claim 1, further comprising a PBS array polarizing to output the light outputted through the color drum.

5. The optical projection system of claim 4, further comprising a PBS receiving the light outputted from the PBS array, the PBS reflecting and transmitting the received light from the PBS array in accordance with polarization to input to the panel.

6. An optical projection system using a color drum, the optical projection system including the color drum outputting an incident light through a predetermined number of color bands on a drum plane, wherein a light outputted from an end of a light projecting plane outputting the incident light has an incident angle equal to or smaller than 30° on the color band, the optical projection system comprising:
   a lens receiving light from a light source, the lens having the light projecting plane the color drum to output the received light;
   the color drum having the predetermined number of the color bands on a color drum plane to output the incident light from the light projecting plane through the color bands, and
   a panel receiving the light outputted from the color drum to modulate to output the received light in accordance with a gray level.

7. The optical projection system of claim 6, comprising:
   a light source; and
   a screen receiving the modulated light from the panel to display.

8. The optical projection system of claim 7, comprising:
   an FEL (fly eye lens) receiving to equalize the light incident from the light source; and
   a PBS array polarizing to output the light outputted through the color drum.

9. The optical projection system of claim 8, further comprising a PBS receiving the light outputted from the PBS array, the PBS reflecting and transmitting the received light from the PBS array in accordance with polarization to input to the panel.

10. The optical projection system of claim 6, wherein the number of the color bands of the color drum is at least six.

11. The optical projection system of claim 6, wherein the light projecting plane is positioned substantially at a center of the color drum.

12. The optical projection system of claim 6, wherein a light passing width L of the color drum is substantially $\pi R/3$, where R is a radius of the color drum.

13. The optical projection system of claim 11, wherein a light passing width L of the color drum is reduced when a width W of the light projecting plane is increased.

14. The optical projection system of claim 13, wherein the width W of the light projecting plane is at least one of a horizontal width and a vertical width.

15. The optical projection system of claim 6, wherein the light projecting plane is offset from a center position of the color drum.

16. The optical projection system of claim 15, wherein as a distance the light projecting plane is offset from the center position of the color drum is increased, a light passing width L of the color drum is reduced.

17. The optical projection system of claim 15, wherein a light passing width L of the color drum is reduced when a width W of the light projecting plane is increased.

18. The optical projection system of claim 17, wherein the width W of the light projecting place is at least one of a horizontal width and a vertical width.

* * * * *